Oct. 19, 1965   W. F. REYNOLDS ETAL   3,212,962
CATIONIC SIZING COMPOSITIONS AND PAPER SIZED THEREWITH
Filed Oct. 22, 1962
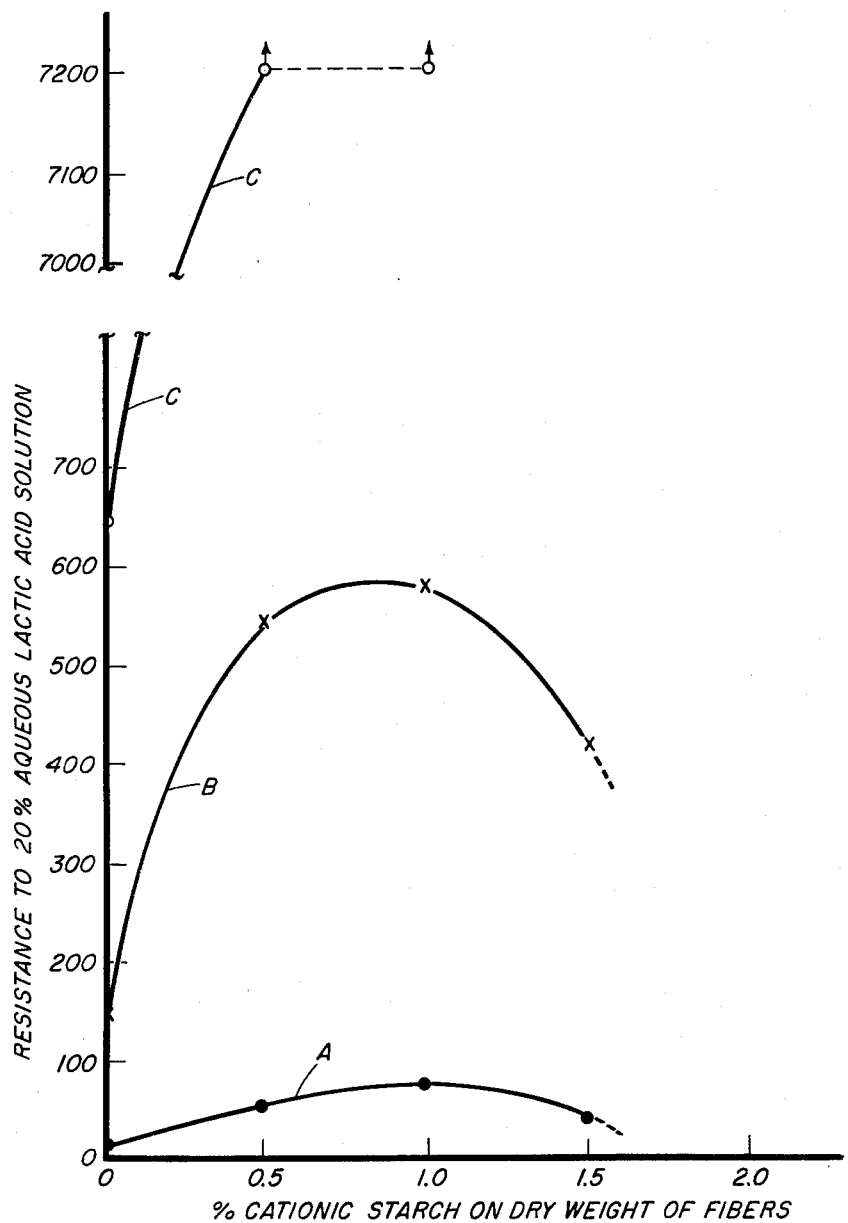
INVENTORS,
WALTER F. REYNOLDS
DAVID R. SEXSMITH
BY
ATTORNEY

United States Patent Office 3,212,962
Patented Oct. 19, 1965

3,212,962
CATIONIC SIZING COMPOSITIONS AND PAPER SIZED THEREWITH
Walter F. Reynolds and David R. Sexsmith, Stamford, Conn., assignors to American Cyanamid Company, Stamford, Conn., a corporation of Maine
Filed Oct. 22, 1962, Ser. No. 232,211
9 Claims. (Cl. 162—168)

The present invention relates to a composition for the manufacture of sized paper. The invention includes the composition, paper-making processes which employ the composition, and the resulting sized paper.

It is known that well-sized paper can be produced by forming an aqueous suspension of cellulose paper-making fibers, adding thereto a small amount of a water-soluble cationic paper-sizing vinyl polymer containing hydrophilic quaternary ammonium substituents, sheeting the suspension to form a water-laid web, and drying the web at a temperature in excess of 190° F.

The polymer is substantively absorbed by the fibers, and the result of the process is well-sized paper.

Absorption of the polymer and starch take place over the range of pH 6–10, so that alkaline paper can be produced if desired. This is an important advantage because alkaline paper is more durable than paper which has an acid pH.

The polymers are effective as sizes when used in a small amount, i.e. within the range of about 0.1%–3%, based on the dry weight of the fiber. Generally about 0.2% is the least amount of polymer needed to produce substantial water-repellence. Maximum sizing is generally attained by the use of about 0.3%–2%, calculated on the same basis.

The polymers may be made by copolymerizing a hydrophobic vinyl monomer such as vinyl stearate, styrene, methyl styrene, acrylonitrile, etc. with a hydrophilic vinyl monomer such as vinyl chloroacetate, 2-chloroethyl acrylate, p-chloromethyl styrene, and quaternizing the resulting polymer with trimethylamine, pyridine, a picoline, etc. Reciprocally, they may be made by copolymerizing a vinyl monomer such as vinyl stearate with a vinyl tertiary amine such as vinyl 2-(dimethylamino)ethyl acetate or vinyl pyridine, and quaternizing the resulting polymeric tertiary amine with methyl bromide, ethyl bromide, etc. In preferred embodiments they are substantially composed of —CH$_2$—CH(OOC—R)— and

—CH$_2$—CH(OOC—R')— linkages, wherein —R represents a hydrophobic fatty acid substituent and —R' represents a hydrophilic quaternary ammonium substituent.

A number of members of this group and methods for their preparation are disclosed in Sexsmith U.S. Patent No. 3,050,506, and the present invention is not limited to the use of any particular member.

The discovery has now been made that the sizing imparted by the aforementioned polymers is increased by the presence of a water-soluble cationic starch. These starches, when used alone, are incapable of imparting sizing to cellulose fibers. We have found that when these starches are used in conjunction with the aforementioned polymers, in preferred embodiments they produce more than a ten-fold improvement in the sizing imparted by the polymer.

The reason why this extraordinary improvement occurs is not known and the invention does not depend upon any theory. However, the cationic starch, under the conditions of its use, is non-reactive both with the polymer and the cellulose fibers, and it is thought therefore that it produces its beneficial effect by causing the polymer molecules to assume a different and better orientation or position on the cellulose fibers, that is, a position wherein the hydrophobic portions of the polymer are more exposed. The action of the starch therefore appears to be purely a synergistic one.

A principal embodiment of the invention is paper sized by a uniformly absorbed content of the two aforementioned materials, the starch being present in sufficient amount to augment the effectiveness of the polymer as a size.

The aforementioned paper is manufactured by adding the quaternary ammonium polymer and the cationic starch, preferably as dilute aqueous solutions, to an aqueous suspension of cellulose papermaking fibers, sheeting the fibers to form a water-laid web, and drying the web. The sizing action of the polymer and the synergistic action of the starch are both substantially complete when the paper is dried under customary drying conditions, i.e., when the paper is dried for ¼ to 3 minutes at 190° to 250° F.

The suspension of cellulose fibers may have any pH when the starch and polymer are added, but for best results the pH of the suspension on sheeting should be 6 or higher.

The starch and polymer may be added together as a dilute aqueous solution, or may be added separately to the fibrous suspension. If added separately, good results are obtained regardless of the order in which the materials are added, but there is evidence that better sizing is often obtained when the starch is added in absence of the polymer, so that this method of addition is preferred.

In the papermaking process, sufficient polymer should be employed to produce at least substantial sizing, and in general for this purpose the weight of the size should be more than about 0.2% of the dry weight of the fibers. Maximum water-repellence per unit weight of size employed is generally achieved in the range of ⅓% to 2% based on the dry weight of the fibers, which is therefore regarded as the preferred range.

A small amount of starch (for example, a few percent of the weight of the polymer which is added) produces an appreciable increase in the efficiency of the size. Larger amounts of starch produce larger benefits, but in each instance a peak is reached beyond which an increase in the amount of starch produces no benefit. The addition of a still larger amount of starch caused the water-resistance of the paper to decline from this maximum.

This phenomenon is illustrated by the drawing, which presents three graphs showing the effect of varying amounts of cationic starch upon the sizing imparted by the quaternary ammonium polymer at three levels.

Each graph is based upon the results obtained from a series of runs made by taking aliquots from a master batch of well-beaten, bleached southern pine cellulose papermaking fibers at a consistency of 0.6% at pH 6, adding to each a fixed amount of quarternary ammonium polymer and a varied amount of cationic starch, adjusting the pH of the aliquots to 7, stirring the aliquots for a few minutes to permit the agents to be absorbed by the fibers, sheeting the fibers to form paper having a basis weight of about 200 lbs. (25" x 40"/500 ream), and drying the sheets by two passes of one minute each over a drying drum at 240° F.

The quaternary ammonium size and the cationic starch corresponded to the agents described in Example 1 below. The agents were added as dilute aqueous solutions.

In the runs of Graphs A, B, and C, the aliquots were treated first with cationic starch in the amounts shown on the ordinate of the graph, so that each aliquot of each series received a different amount of cationic starch.

The aliquots of Graph A were then treated with 0.30% of the quaternary ammonium polymer based on the dry weight of the fibers, the aliquots of Graph B with 0.35% of the polymer and the aliquots of Graph C with 0.40% of the polymer calculated on the same basis.

The sizing of the handsheets was determined by application of 20% aqueous lactic acid solution at 100° F. under a 12" head, a penescope being used to hold the paper during the test. Hot dilute aqueous lactic acid was used as the test fluid because it is a more severe agent than water and ink commonly employed. The tests were discontinued when handsheets remained resistant at 7,200 seconds (2 hours), this value being materially in excess of commercial requirements.

The results show that when the weight of polymer added was 0.30% of the dry weight of the fibers (Graph A), the cationic starch caused the sizing to increase very considerably. Without the starch the sheets resisted the acid for about 10 seconds, and with the cationic starch the sizing increased to about 80 seconds. At this point, the weight of the starch was about 3 times the weight of the polymer.

The results further show that when the weight of polymer added was 0.35% of the dry weight of the fibers (Graph B), the cationic starch caused the sizing to increase from a value of about 140 seconds to about 590 seconds. At this peak, the weight of the starch was between 2 and 3 times the weight of the polymer.

Finally, the results show that when the weight of the polymer added was 0.40% of the dry weight of the fibers (Graph C), the cationic starch caused the sizing to increase from about 650 seconds to a value in excess of 7,200 seconds. In the graph, upwardly-pointing arrows are used to show that the tests were discontinued. These results were caused by a cationic starch in amount 25%–150% in excess of the weight of the size.

It is a feature of the invention that the starch and the polymer are compatible so that they can be formed into a particulate free-flowing dry blend which can be transported and stored for long periods of time without deterioration and which can be readily dissolved in water to provide the desired sizing solution. The blend consists essentially of the water-soluble cationic quaternary ammonium polymer and the starch in desired or optimum weight ratio. Best synergistic action takes place when the polymer and the starch are present in weight ratio between 1:1 and 1:3. The starch normally exists as a dry powder of fine particle size, and it is preferred that the polymer be ground to approximately the same particle size, so as to form a blend which does not undergo classification when subjected to vibrations such as occurs during shipment by railroad.

The starch used in the present invention are water-soluble starches which are cationic by reason of the presence therein of basic nitrogenous groups. Starches of this type and methods for the preparation thereof are disclosed in Elizer et al. U.S. Patents 3,051,961 and 3,051,698–700 inclusive, and in Paschall U.S. Patent No. 2,894,944.

The invention includes blends of the two agents decribed above, alone or in admixture with such compatible materials as are customarily used in the manufacture of paper as, for example, dyes and pigments.

The aforementioned blends readily form solutions when stirred into hot water having a pH in the range of 5–9, and this is one preferred way of preparing the blends for use. The resulting solutions, which advantageously contain 1% to 5% by weight of the agents, are suitable for direct addition to the fibrous cellulose suspension.

If desired, the agents may be separately dissolved in water and the resulting solutions may be consecutively or simultaneously added to the cellulose fiber suspension.

The invention is further illustrated by the examples which follow. These examples constitute specific embodiments of the invention and are not to be construed as limitations thereon.

Example 1

The following illustrates the preparation of a dry blend of a water-soluble cationic paper-sizing polymer containing hydrophilic quaternary ammonium substituents, and a water-soluble cationic starch as agent augmenting the sizing effectiveness of the polymer. The following also illustrates the sizing results afforded by this blend in comparison with the results afforded by the polymer and by the cationic starch, each when used alone.

The polymer employed is prepared by reacting vinyl stearate and vinyl chloroacetate in 1:1 molar ratio in benzene solution using benzoyl peroxide as initiator, followed by quaternization of the resulting polymer by reaction with a mixture of 3- and 4- picolines (cf. Daniel et al. U.S. Patent No. 2,914,513). The resulting polymer is composed of —$CH_2$—$CH(OOC—C_{17}H_{35})$— and $CH_2$—$CH(OOC—CH_2—Py)$—linkages, wherein Py represents a pyridinium (specifically a methylpyridinium) substituent. The polymer is a friable solid and is pulverized to a fine powder in a laboratory hammer mill.

100 g. of the product are dry-blended with 300 g. of a water-soluble commercial cationic starch manufactured by reacting 50% amylose cornstarch with an aqueous solution of sodium cyanamide as shown in Example 6B of Elizer et al. U.S. Patent No. 3,051,700. The particle size of the two components is substantially the same, and by shaking the two together in a laboratory flask, a free-flowing, light somewhat dusty powder is obtained which shows no tendency to separate into layers when vibrated.

The comparative effectiveness of the polymer, the starch, and the blend of the two materials as paper sizes is determined by standard laboratory method wherein the material to be tested is added to an aqueous suspension of well-beaten, bleached pine kraft cellulose papermaking fibers, the pH of the suspension is adjusted to 7, the suspension is stirred for a few minutes to permit the material under test to be absorbed by the fibers. The suspension is sheeted on a Nash handsheet machine to form handsheets having a basis weight shown in the table below, and the resulting handsheets are pressed between blotters and dried at 240° F. The resulting sheets are then subjected to a standard laboratory lactic acid penetration test employing 20% aqueous lactic acid applied by penescope at a head of 12" and temperature of 100° F.

Results are as follows:

| Run No. | Agent Added | | Paper | |
|---|---|---|---|---|
| | Name | Percent [1] | Basis Wt., Lb.[2] | Lactic Acid Resist., Sec. |
| 1 | Starch | 1.0 | 238 | 0 |
| 2 | Polymer | 0.35 | 242 | 165 |
| 3 | Blend | 1.35 | 234 | 2,385 |

[1] Based on dry weight of fibers.
[2] 25" x 40"/500 sheet ream.

The results show that the cationic starch greatly augments the effectiveness of the polymer as a size.

Example 2

The procedure of Run 3 is repeated except that the starch and the polymer are added separately, the starch being added first. The resulting paper has a lactic acid resistance in excess of 3,600 seconds at a basis weight of 234 lbs.

Example 3

The procedure of Example 2 is repeated except that the cationic starch is the starch prepared by reacting starch in aqueous sodium hydroxide solution containing $Na_2SO_4$ with 2-diethylaminoethyl chloride for 24 hours, as disclosed in U.S. Patent No. 2,813,093.

Substantially the same results are obtained.

Example 4

The procedure of Example 2 is repeated except that the polymer is prepared by reacting the vinyl stearate-vinyl-chloroacetate copolymer with one mol of pyridine.

The paper has a lactic acid resistance value in excess of 3,000 seconds.

Example 5

The following illustrates the effect of varying the amounts of the polymer and of the starch.

The polymer and starch used are the materials employed in Example 1. The procedure of Example 1 is followed, except that the starch is added first to the paper pulp, as shown in Example 2. Results are as follows:

| Run No. | Agent Added, Percent* | | Lactic Acid Resist., Sec. |
|---|---|---|---|
| | Polymer | Starch | |
| 1 | 0.35 | 0.0 | 145 |
| 2 | 0.35 | 0.5 | 550 |
| 3 | 0.40 | 0.0 | 650 |
| 4 | 0.40 | 0.5 | 7,200 |
| 5 | 0.40 | 1.0 | 7,200 |

*Based on dry weight of fibers.

The results indicate that best results are obtained when the amount of polymers added is about 0.4% or more of the dry weight of the fibers, and when the weight of the cationic starch is at least about equal to the weight of the polymer.

Example 6

A highly particulate, somewhat dusty powder similar to the dry, powdery, polymer-starch blend of Example 1, is moistened by a spray of water and is passed through a chaser mill. Spherical prills of the blend $\frac{1}{50}''$ to $\frac{1}{10}''$ in size are obtained, which are free-flowing and non-dusty when dry and which dissolve readily in hot alkaline water.

We claim:

1. A dry particulate blend consisting essentially of a water-soluble cationic paper-sizing polymer containing hydrophilic quaternary ammonium substituents, and a water-soluble cationic starch as agent augmenting the sizing effectiveness of said polymer, the weight ratio of the paper-sizing polymer to the cationic starch being between 1:1 and 1:3.

2. A dry particulate blend consisting essentially of a water-soluble cationic paper-sizing polymer substantially composed of —CH$_2$—CH(OOC—R)— and

—CH$_2$—CH(OOC—R')— linkages, wherein —R represents a hydrophobic fatty acid substitent and —R' represents a hydrophilic quaternary ammonium substituent, and a water-soluble cationic starch as agent augmenting the sizing effectiveness of said polymer, the weight ratio of the paper-sizing polymer to the cationic starch being between 1:1 and 1:3.

3. A blend according to claim 1 wherein the particles are prilled together to form spheroids $\frac{1}{50}''$ to $\frac{1}{10}''$ in diameter.

4. A dry particulate blend consisting essentially of a water-soluble cationic paper-sizing polymer substantially composed of —CH$_2$—CH(OOC—C$_{17}$H$_{35}$) and —CH$_2$—CH(OO—C—CH$_2$—Py)

linkages, wherein Py represents a pyridinium substituent, and a water-soluble cationic starch as agent augmenting the sizing effectiveness of said polymer, the weight ratio of the paper-sizing polymer to the cationic starch being between 1:1 and 1:3.

5. Paper sized by a uniformly absorbed content of a blend according to claim 1.

6. In the manufacture of sized paper, wherein an aqueous suspension of cellulose papermaking fibers is formed, an aqueous solution of a cationic paper-sizing quaternary ammonium polymer polymer is added thereto, whereby said polymer is substantively absorbed by said fibers, said suspension is sheeted to form a water-laid web, and said web is dried at a temperature in excess of 190° F., the improvement which comprises adding to said suspension prior to sheeting a small but effective amount of a cationic starch in aqueous solution as agent augmenting the sizing effectiveness of said polymer, the weight ratio of the paper-sizing polymer to the cationic starch being between 1:1 and 1:3.

7. A process according to claim 6 wherein the aqueous solution in which the cationic starch is dissolved is the aqueous solution of the polymer.

8. A process according to claim 6 wherein the cationic starch is added to the papermaking suspension prior to the quaternary ammonium polymer.

9. In the manufacture of sized paper wherein an aqueous suspension of cellulose papermaking fibers is formed, an aqueous solution of a cationic paper-sizing quaternary ammonium polymer is added thereto, said polymer being substantially composed of —CH$_2$—CH(OOC—R)— and —CH$_2$—CH(OOC—R')— linkages, wherein —R represents a hydrophobic fatty acid substituent and —R' represents a hydrophilic quaternary ammonium substituent, whereby said polymer is substantively absorbed by said fibers, said suspension is sheeted to form a water-laid web, and said web is dried at a temperature in excess of 190° F., the improvement which comprises adding to said suspension prior to sheeting a small but effective amount of a cationic starch in aqueous solution as agent augmenting the sizing effectiveness of said polymer, the weight ratio of the paper-sizing polymer to the cationic starch being between 1:1 and 1:3.

References Cited by the Examiner

UNITED STATES PATENTS

| 2,914,513 | 11/59 | Daniel | 260—85.7 |
| 3,001,957 | 9/61 | Kray et al. | 260—17.4 |
| 3,051,700 | 8/62 | Elizer et al. | 260—233.3 |

WILLIAM H. SHORT, *Primary Examiner.*